United States Patent [19]

Kawaguchi

[11] Patent Number: 5,584,523
[45] Date of Patent: Dec. 17, 1996

[54] TONNEAU COVER

[75] Inventor: Masami Kawaguchi, Hilliard, Ohio

[73] Assignee: Honda Giken Kogyo Kabushiki Kaisha, Tokyo, Japan

[21] Appl. No.: 264,799

[22] Filed: Jun. 23, 1994

[51] Int. Cl.$^6$ ............................................. B60R 7/02
[52] U.S. Cl. .................................................. 296/37.16
[58] Field of Search ..................... 296/98, 136, 37.16; 160/294, 293.1, 290.1, 305

[56] References Cited

U.S. PATENT DOCUMENTS

| | | | |
|---|---|---|---|
| 609,134 | 8/1898 | Beckwith et al. | 160/294 |
| 1,706,261 | 3/1929 | Strongson | 160/293.1 |
| 4,220,367 | 9/1980 | Gale et al. | 296/37.16 |
| 4,502,674 | 3/1985 | White et al. | 296/37.16 |
| 4,728,141 | 3/1988 | Motozawa et al. | |
| 4,776,625 | 10/1988 | Lobanoff et al. | |
| 5,078,446 | 1/1992 | Walter | 296/98 |
| 5,213,387 | 5/1993 | Decker et al. | |
| 5,224,748 | 7/1993 | Decker et al. | 296/37.16 |

FOREIGN PATENT DOCUMENTS

| | | | |
|---|---|---|---|
| 2694732 | 2/1994 | France | 296/37.16 |

*Primary Examiner*—Gary C. Hoge
*Attorney, Agent, or Firm*—Armstrong, Westerman, Hattori, McLeland & Naughton

[57] ABSTRACT

A tonneau cover assembly, such as for a compartment at the rear end of a vehicle includes a housing which has an opening in one side and a rotatable spool therein. A tonneau cover, i.e. a cover, extends through the opening, is secured to the spool, and wound on the spool such that the tonneau cover is movable between a fully extended position and a fully retracted position wherein the tonneau cover is fully wound onto the spool. A torsion spring biases the tonneau cover towards the fully retracted position. The tonneau cover includes a generally rigid flap attached at an outer end of the tonneau cover which has a handle thereon. Two stop members are attached to at opposite sides of the flap, and they are sized to prevent the flap from fully entering the opening and winding onto the spool. Each stop member has a wedge-shaped section which narrows in an inward direction towards the housing such that the stop member is wedged into the opening so as to inhibit the flap from vertically oscillating within the opening. The stop members also include projections for securing the stop members to supports to hold the tonneau cover in an extended position.

16 Claims, 6 Drawing Sheets

TONNEAU COVER

BACKGROUND OF THE INVENTION

This invention relates generally to a cover apparatus which selectively covers or exposes a compartment area, particularly a cargo area of a vehicle, such as a rear tonneau compartment area.

Tonneau cover assemblies usually serve as a means to conceal the contents of the tonneau cargo area, or rear compartment, of a hatchback, station wagon, pickup truck or other type of vehicle which may have luggage, equipment or other personal items contained therein.

There have been a variety of tonneau cover assembly devices developed for the tonneau compartment of a vehicle. However, this invention most specifically relates to a retractable tonneau cover assembly which has a flexible tonneau cover that is retracted into a housing by a biasing means.

One general example of a known retractable tonneau cover assembly is shown in U.S. Pat. No. 4,776,625 wherein a roll-up cover member 52 is retractable into a housing 54 and can be unwound to obscure the view of the contents of the vehicle compartment 12.

Figures 10, 11:
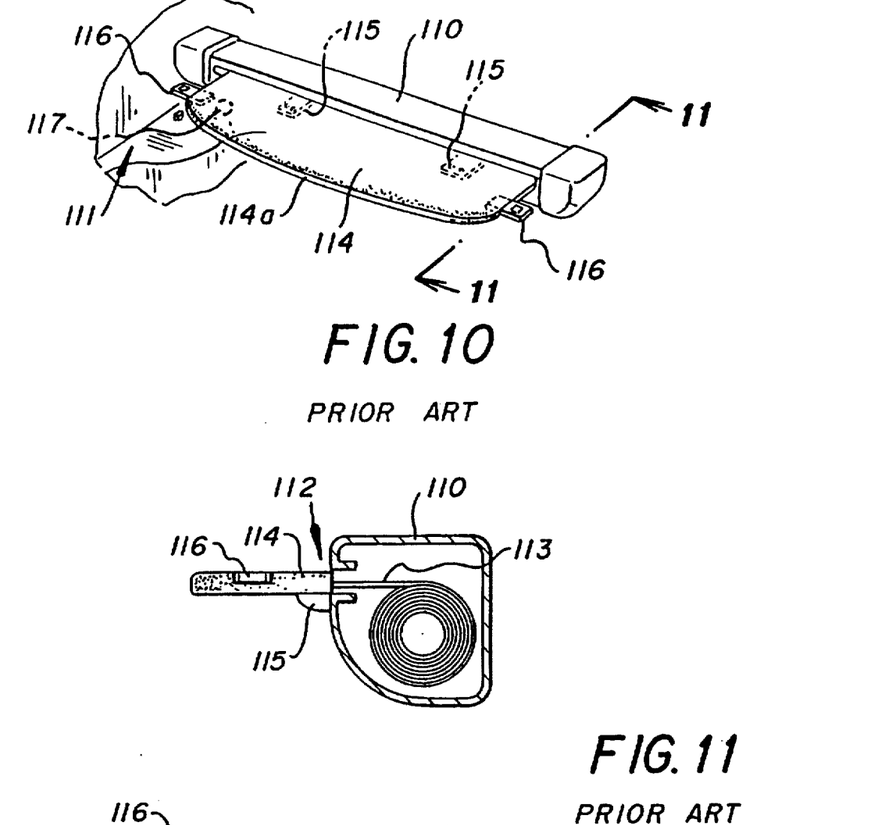
FIG. 10 is a top perspective view of a prior art tonneau cover assembly.
FIG. 11 is a cross-sectional view taken along line 11—11 in FIG. 10.
Figure 12:
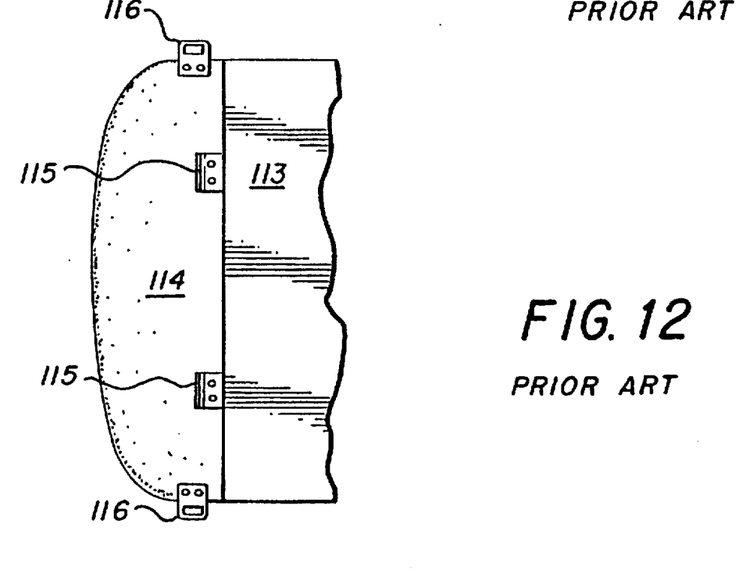
FIG. 12 is a bottom plan view of the prior art tonneau cover assembly shown in FIGS. 10 and 11.

Another known retractable tonneau cover assembly is shown in FIGS. 10–12. In the latter known vehicle tonneau cover assembly, the tonneau cover assembly includes a flexible tonneau cover portion and a more rigid flap secured to the outer free end of the tonneau cover. The flap has two stop members on the bottom side thereof to prevent the flap from entering the opening in the housing.

However, this flap is not rigidly secured when the tonneau cover is retracted within the housing. This permits the flap to vibrate when the vehicle is traveling along a roadway. Among other things, this vibration is distracting to the driver and causes wear marks on the cargo area walls. In some instances, vibration absorbing mounts have been placed on the cargo walls between the flap and the walls so that the wear and the noise are reduced.

FIG. 10 is a perspective view of the latter prior art tonneau cover assembly. The device includes a housing 110 which is mounted on the inside walls 111 of the vehicle at the front of the cargo area immediately behind the back of the rear seat. The housing 110 has an opening 112 through which the tonneau cover 113 passes to enter or exit the housing. The tonneau cover 113 has one end secured to a spring biased spool (not shown) within the housing 110 which biases the tonneau cover 113 towards the fully retracted position. A generally rigid flap 114 is secured to the outer free end of the tonneau cover, and the flap is shaped to conform to the shape of the rear wall of the cargo area. Two rubber stoppers 115 are mounted on the bottom side of the flap 114 which serve to prevent the flap 114 from entering the opening 112 when the cover 113 is retracted. In addition, separate fasteners 116 are mounted on the opposite lateral side edges of the flap 114 in order to engage fasteners (not shown) on the side walls 111 adjacent the rear wall of the vehicle to maintain the tonneau cover 113 in the fully extended, or open, position.

As noted, the flap edge 114a must conform to the shape of the rear wall of the cargo area, which is generally an arcuate shape. Among other things, the arcuate nature of the flap edge 114a and the size of the housing prevent the flap 114 from being stored in the housing when retracted. Consequently, the weight of the flap 114 causes the flap to droop downwardly, and potentially engage the side wall 111, as noted. Further, road irregularities cause the flap 114 to vibrate against the side walls 111 and against the housing 110. This vibration, thereby, creates irritating noises within the vehicle cabin. In addition, wear marks are, thus, made on the side walls 111.

Added shock absorbing material 117 has been sometimes placed on the bottom of the flap 114 adjacent the lateral side edges to dampen the vibration of the flap against the side walls 111 and to reduce wear marks on the side walls 111.

Prior to the present invention, the known vehicle retractable tonneau cover assemblies had problems related to, among other things, noise, wear, excess numbers of parts and excess weight, etc.

SUMMARY OF THE INVENTION

In view of such problems in prior art devices, the present invention has been developed in order to, among other things, (1) avoid the problems in the prior art devices and (2) provide a very economical assembly wherein the weight and number of component parts are minimized.

Therefore, a primary object of this invention is to provide a retractable tonneau cover assembly which is economically constructed and which is rigidly secured when the tonneau cover is retracted.

Another object of this invention is to provide a retractable tonneau cover assembly for a vehicle which does not cause frictional wear inside the vehicle and/or noise resulting from vibrations during use when in a retracted state.

Another object of this invention is to achieve the above objects while minimizing (a) the number of parts required and/or (b) the weight of the structure.

Another object of this invention is to provide a stop member for a tonneau cover assembly which is attachable to the tonneau cover and which has means for decreasing vibrations, means for limiting retraction of the tonneau cover into its housing, and/or means for securing the tonneau cover in an extended state incorporated therein as a single unit.

The above and other objects are achieved in accordance with the present invention, in which:

According to a first aspect of the invention, a tonneau cover assembly is provided which comprises: a housing having an opening in one side thereof and having upper and lower walls located adjacent to the opening; a spool rotatably mounted within the housing; a tonneau cover extending through the opening and having an inner end secured to the spool, the tonneau cover being windable on the spool such that the tonneau cover is movable between a fully extended position and a fully retracted position wherein the tonneau cover is fully wound onto the spool, and the tonneau cover including a generally rigid flap attached at an outer end of the tonneau cover and extending substantially across a width of the tonneau cover; means for winding the spool so as to bias the tonneau cover toward the fully retracted position; at least a first stop member attached to the flap, wherein the stop member (a) has a dimension that is greater than a height between the upper and lower walls to prevent the flap from winding onto the spool when the tonneau cover is in the fully retracted position and (b) is fittable in between the upper and lower walls in the fully retracted position so as to inhibit the flap from vertically oscillating within the opening.

According to a second aspect of the invention, the stop member is secured to a periphery of the flap and has a wedge-shaped section which narrows in an inward direction towards the housing, a widest portion of the wedge-shaped section being greater than the height between the upper and lower walls, whereby the stop member is wedged into the opening when the tonneau cover is in the fully retracted position.

According to a third aspect of the invention, there is a second stop member, wherein each of the stop members is secured to a respective peripheral lateral side edge of the flap.

According to a fourth aspect of the invention, the stop member includes a projection which extends generally vertically from the stop member and which has a contact surface facing the housing and abuttable against the housing to prevent the flap from entering the opening when the tonneau cover is in the fully retracted position.

According to a fifth aspect of the invention, at least the first stop member further includes securing means for securing the flap to a fixed support to maintain the tonneau cover in the fully extended position.

According to a sixth aspect of the invention, the securing means includes a laterally extending protuberance.

According to a seventh aspect of the invention, the housing is engaged with a side support in a cargo area of a vehicle, and the protuberance is adapted to engage a corresponding receptacle on a rear end side support in the vehicle when the tonneau cover is in the fully extended position, whereby the cargo area is covered by the tonneau cover assembly when the protuberance is engaged with the rear end side support.

According to an eighth aspect of the invention, the upper and lower walls are at upper and lower edges of the opening.

According to a ninth aspect of the invention, the upper and lower edges of the housing include a trim extrusion thereon.

According to a tenth aspect of the invention, a tonneau cover assembly is provided which comprises: a housing having an opening in one side thereof; a tonneau cover which extends through the opening into the housing and which includes a generally rigid flap at an outer end thereof extending substantially across a width of the tonneau cover; biasing means for biasing the cover into the housing such that the tonneau cover is movable between a fully extended position and a fully retracted position; at least a first stop member attached to the flap, the stop member comprising a single integral piece, which includes (1) retraction limiting means for limiting inward movement of the flap into the opening, (2) vibration damping means for reducing vibrations in a vertical direction, and (3) extension securing means, cooperatively engageable with predetermined fixed supports, for securing the tonneau cover in the fully extended position.

According to an eleventh aspect of the invention, a stop member for a tonneau cover assembly in which a tonneau cover is retractable into a housing, is provided, wherein the stop member comprises: means for attaching the stop member to the tonneau cover; and vibration damping means for reducing vibrations in a vertical direction, wherein the stop member comprises a single integral piece.

According to a twelfth aspect of the invention, the stop member further includes retraction limiting means for limiting inward movement of the tonneau cover into the housing.

According to a thirteenth aspect of the invention, the stop member further includes extension securing means, cooperatively engageable with predetermined fixed supports, for securing the tonneau cover in the fully extended position.

According to a fourteenth aspect of the invention, the vibration damping means includes a wedge-shaped section for wedgingly securing the stop member with respect to t housing.

The present invention, therefore, has significant adva tages, including:

(1) Economic advantages and minimization of parts a weight: In this regard, each of the stop members can b "single" piece member which incorporates a variety functions in the one "single" piece (such as with, but r limited to, the tenth and eleventh aspects above), where economic advantages and minimization of parts a weight is greatly enhanced. A "single" piece stop memb according to the most preferred embodiment can inc porate the following features and their functions: ( retraction limiting means which limits inward movem of the tonneau cover; (2) vibration damping means a wear reducing means; and (3) extension securing me for securing the cover in an extended position. Thus, the preferred construction, the present invention combir all or some of these features into a "single" eleme thereby minimizing weight and the number of parts assembly.

Furthermore, the developed structure, of all of the no aspects, does not require nor utilize an excess number parts, and the parts developed can be constructed of minin size and weight while still greatly performing their intend functions.

Furthermore, the present invention is easy to manufactu For example, when a single piece stop member is c structed, it can be formed easily, and efficiently attached the tonneau cover. Furthermore, when the single stop me ber includes a variety of functional parts, no additio members need to be added; thereby, reducing constructi time, costs, and weight.

Furthermore, the present invention does not require elaborate housing structure in order to achieve the adv tages and functions of the invention.

(2) Reduction Of Vibrations And Reducing Of Wear: In present invention, frictional wear inside the vehicle eliminated. Thereby, among other advantages, preservi higher quality of the product over extended use.

In addition, noise resulting from vibrations during when in a retracted state is also eliminated. Thereby, amc other advantages, creating greater driving comfort safety.

The present invention enables a rigidly secured tonn cover which is economically beneficial and which mi mizes the parts required, and which is far superior to prior developed devices.

The above and other (a) objects, (b) advantages, features and (d) aspects of the present invention will be m readily perceived from the following description of preferred embodiments thereof taken together with accompanying drawings and claims.

BRIEF DESCRIPTION OF THE DRAWINGS

The present invention is illustrated by way of exam and not limitation in the accompanying drawings, in wh like references indicate like parts, and in which.

DETAILED DESCRIPTION OF THE PREFERRED EMBODIMENTS

Figure 1:
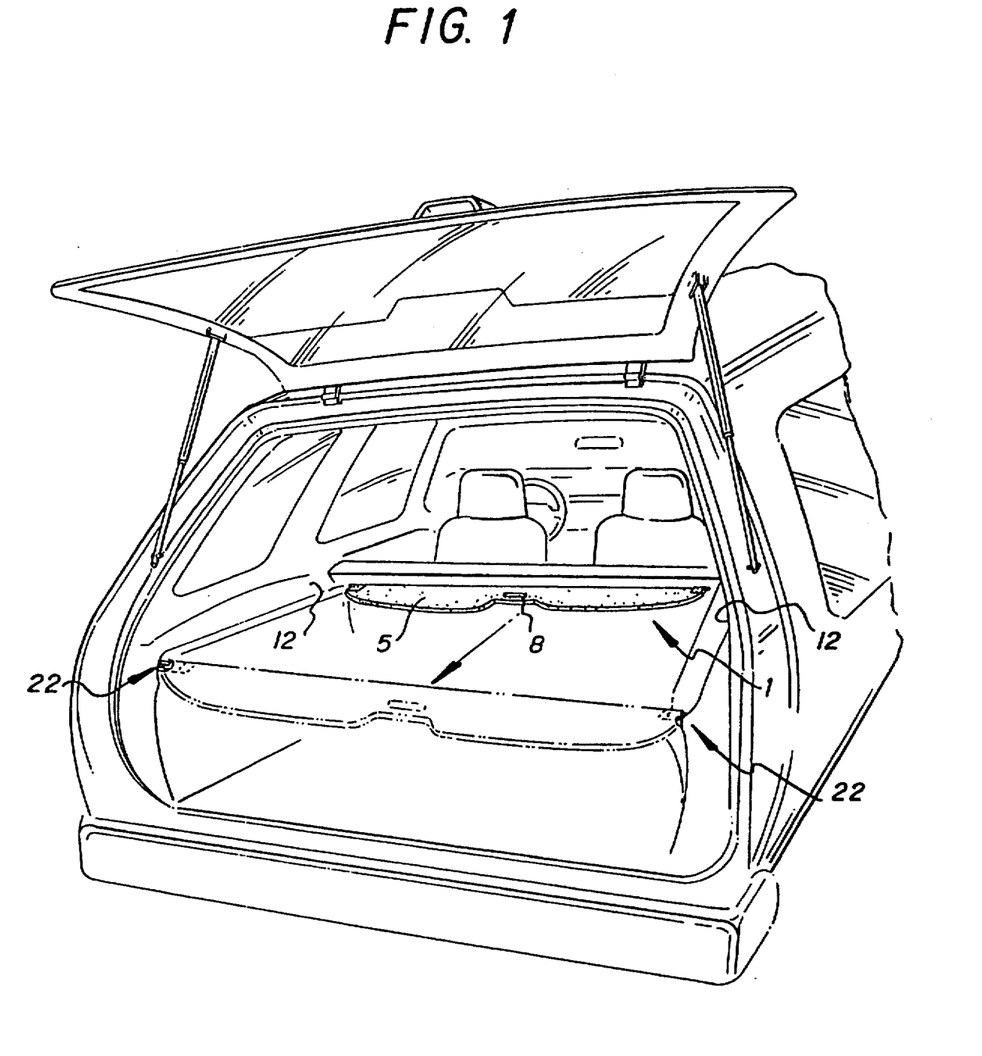
FIG. 1 is a top perspective view of a tonneau co assembly mounted in the rear tonneau area of a vehi according to a first embodiment of the invention.

As illustrated in FIG. 1, the tonneau cover assembly 1 according to the preferred embodiment of the invention is situated in the rear cargo area of a vehicle (the tonneau compartment area).

In use, the tonneau cover 2, shown in FIG. 2, of the tonneau cover assembly 1 is moved between two specific positions, (1) a fully retracted position (shown in dark lines in FIG. 1 ) wherein the compartment area is visible and accessible from the back of the vehicle and (2) a fully extended position (shown in dotted lines in FIG. 1) wherein the tonneau cover covers the tonneau cargo area and wherein the tonneau cover is fixedly held by a connection portion of the vehicle (as discussed below).

Figure 2:
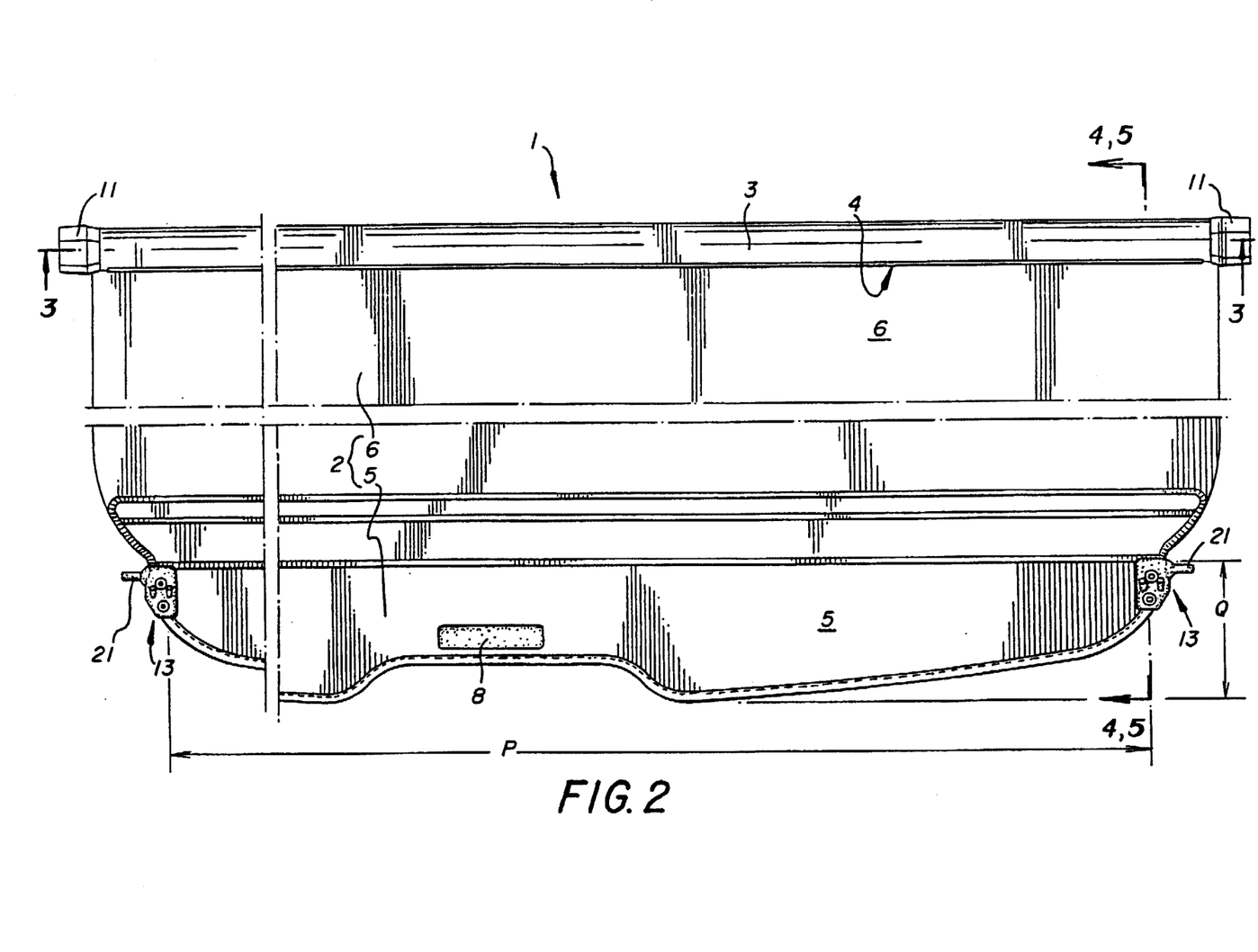
FIG. 2 is a top plan view of the tonneau cover assem of the first embodiment shown in FIG. 1.
Figures 4, 5:
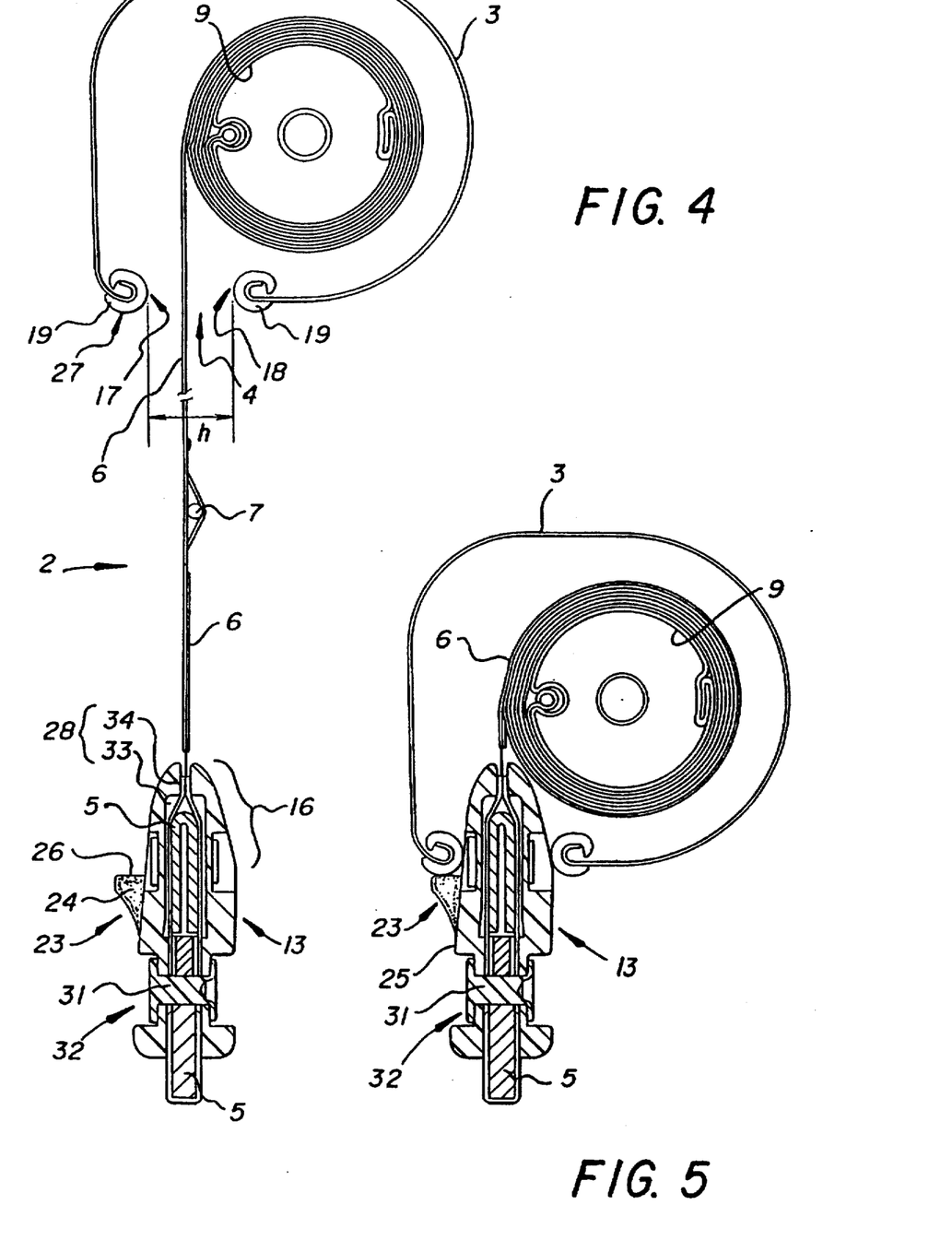
FIG. 4 is a sectional view showing the tonneau cover according the first embodiment in an extended state and taken in a direction along section 4/5–4/5 shown in FIG. 2.
FIG. 5 is a sectional view showing the tonneau cover according to the first embodiment in a retracted state and taken in a direction along section 4/5–4/5 shown in FIG. 2.

Referring to FIGS. 2, 4 and 5, the tonneau cover assembly according to the instant invention comprises a housing 3 and a tonneau cover 2 which is movable in and out of the housing 3 between the fully extended position and the fully retracted position.

The housing includes an elongated opening 4, see FIG. 4, in one side thereof. The opening 4 has a sufficient width to accommodate the width of the tonneau cover portion which enters the housing when retracted.

The illustrated tonneau cover 2 includes two sections, (1) a generally rigid flap section 5 and (2) a flexible cover section 6.

As further shown in FIGS. 2, 4 and 5, the flap 5 is mounted on, or otherwise formed at, the outside free end of the flexible cover 6. The flap (1) helps to maintain the structural shape of the tonneau cover, but also (2) as in the prior art tonneau cover, the flap is shaped to conform to the rear wall of the vehicle. As illustrated in FIG. 2, the side of the housing having the elongated opening is preferably generally linear. On the other hand, the rear end wall of the vehicle is usually non-linear, or a generally arcuate configuration, such as also seen in FIG. 2.

Therefore, the flap is formed with a width Q, as indicated in FIG. 2.

Preferably, the flap is formed with a plastic material. In addition, the rigidity of the flap portion can be due to or enhanced by an inner frame structure.

The flexible portion 6 of the tonneau cover 2 can be formed, as an example, with a polyester basic fabric material. In addition, as shown in FIG. 4, a stiffener rod 7 can be included in the flexible cover section 6 in order to enhance rigidity in a lateral direction.

As also shown in FIG. 2, the flap further serves as a means for providing a handle 8 (as discussed below).

Figure 3:
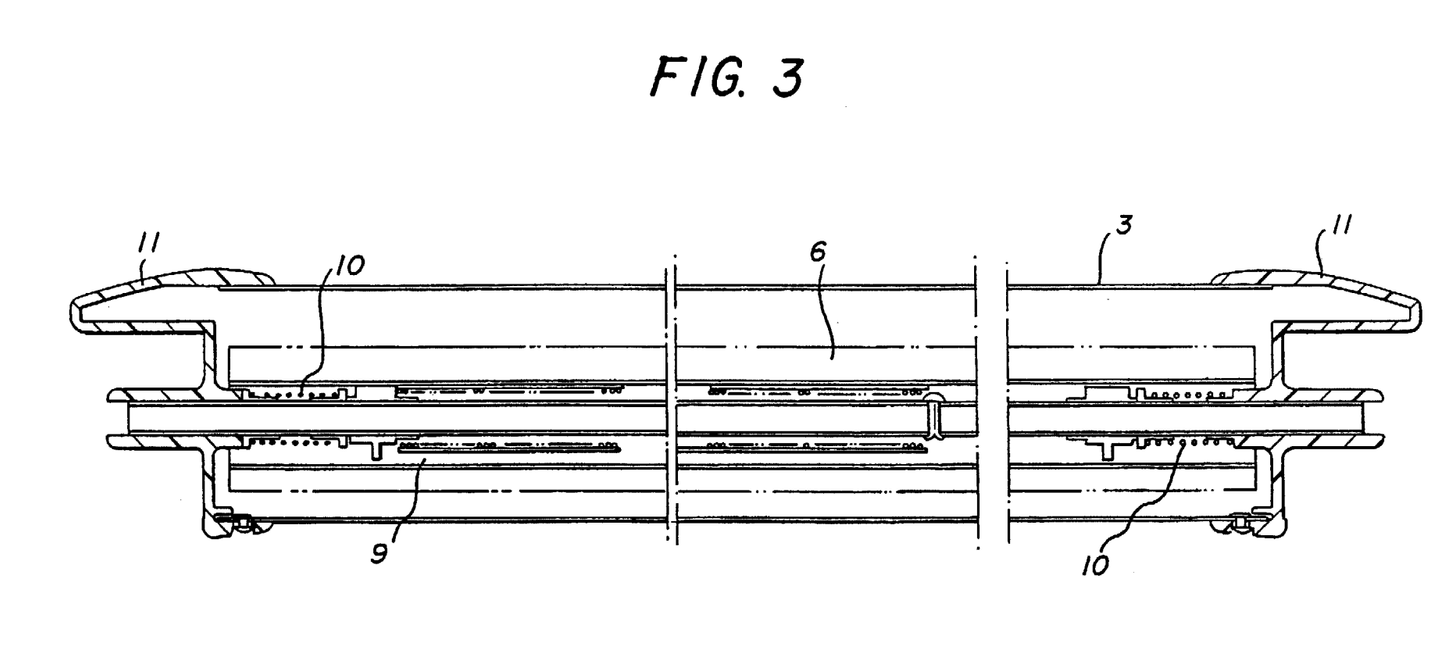
FIG. 3 is a cross-sectional view taken along cross-sect 3—3 in FIG. 2.

As shown in FIGS. 3–5, one end of the flexible cover extends into the opening 4 of the housing 3 and is secured to a spool 9 which is rotatably mounted within the housing. The tonneau cover 2 is wound onto the spool 9 as the tonneau cover 2 is moved from the fully extended position to the fully retracted position.

In order to provide a winding force, at least one torsion spring 10, shown in FIG. 3, located inside the spool 9 biases the tonneau cover toward the fully retracted position shown in FIG. 5. The torsion spring 10 can be connected in any manner as would be readily understood by one of ordinary skill in the art. For example, the spring 10 can be attached at one end to a fixed central shaft which passes therethrough and at another end to the inside of the spool 9. Although a torsion spring 10 is the preferred embodiment, it should be apparent that other types of winding means may be employed, i.e. other devices capable of exerting a turning force on the spool 9 in order to wind the tonneau cover to a retracted state, including, as examples, a motor device or other resilient means. In addition, although preferred for compactness, etc., the spool 9 does not necessarily have to be hollow with a winding means therein, but it can be a solid shaft with an external winding means.

Furthermore, although a winding means is the preferred form of retracting the tonneau cover 2 because, among other windings, a winding means has size and material minimizing benefits, the present invention also contemplates other biasing means for moving the cover into a retracted position in the housing such that the tonneau cover 2 is movable between a fully extended position and a fully retracted position. For example, the tonneau cover 2 may be slid or otherwise moved into a housing, without winding.

As noted above, the flap 5 further serves as a means for providing the handle 8, as shown in FIG. 2. As should also be apparent, one can extend the tonneau cover 2 by pulling on the handle 8.

As should also be apparent from this description herein in the preferred construction, the tonneau cover 2 is constantly urged into the retracted position, so that if one releases the handle 8 prior to fixing it in the fully extended position (as discussed below), the cover 2 will return to the retracted state.

FIGS. 2–3 also illustrate mounts 11 which secure the housing onto side supports within the vehicle cargo area behind the rear seat of the vehicle. As would be apparent to one of ordinary skill in the art, the mounts 11 may be of many constructions and are not limited to the illustrated structure. The mounts 11 should be capable of firmly holding and attaching the housing within the vehicle, such as to the side walls 12 of the vehicle. As examples, brackets, clamps or other connections can be used. The mount members 11 are, thus, configured to be mounted on side supports of the cargo area of the vehicle.

In the illustrated embodiment, as shown in FIGS. 2, 4 and 5, the flap 5 has two stop members 13 attached thereto which prevent the flap 5 from entering too far into the housing 3 by winding too far onto the spool 9, as the tonneau cover 2 is wound into the fully retracted position. Each stop member 13 is secured to a respective lateral side edge 14, 15 of the flap, as shown in FIG. 2.

Each stop member 13 has a wedged-shaped section 16 at a rear side of the stop member 13 which faces inward towards the housing 3. The wedge-shaped section 16 is formed by inclining the upper and lower surfaces of the stop members over a portion as illustrated. The widest portion of the wedged-shaped section 16 is greater than the height h of the opening so as to ensure a secure fitting wedge connection.

Although two stop members 13 are preferred, additional, or possibly fewer, stop members 13 could be included, although such would clearly be less desirable, such as from the standpoints of stability, secureness and/or minimization of parts.

In operation, when in the fully retracted position, each of the stop members 13 is wedged into the opening 4 in the housing, as shown in FIG. 5. The wedging action created is preferably sufficient to rigidly secure the stop members 13 against the housing 3 and to prevent the flap 5 from vibrating or oscillating, such as (a) in a vertical direction by the contact with upper and lower walls 17, 18, respectively, of the opening 4, and (b) in a horizontal direction, or in a pivotal direction about the opening, by the wedging forces acting thereon.

The spring force of the torsion spring 10, the size and weight of the flap portion 5, and the materials of the stop members 13 and housing 3 are among the factors considered in determining the wedging action. One of ordinary skill in the art would recognize that these factors could be varied depending on circumstances.

In one preferred construction, the stop members 13 are made of a synthetic resin material, and the housing 3 includes a trim extrusion material 19 on the upper and lower edges 17, 18 of the opening. The trim extrusion material 19 can be used to enhance wedging contact and/or reduce wear of the respective parts.

FIGS. 6–9 more specifically illustrate the most preferred structure of the stop members 13.

Figures 6, 7, 8, 9:
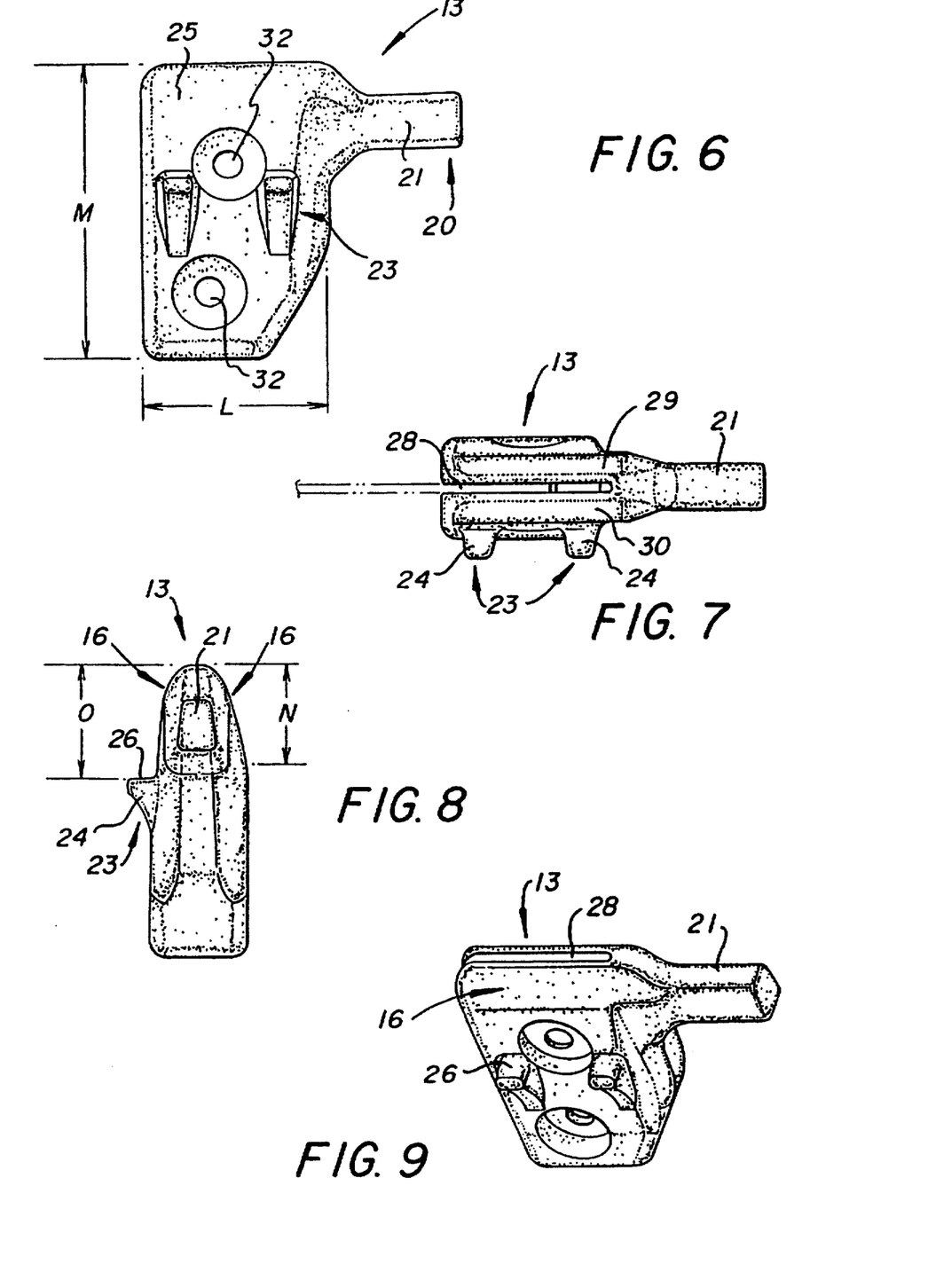
FIG. 6 is a top plan view of one of the stop members according to the first embodiment.
FIG. 7 is a side view of the uppermost side of the stop member shown in FIG. 6.
FIG. 8 is a side view of the rightmost side of the stop member shown in FIG. 6.
FIG. 9 is a top perspective view of the stop member shown in FIG. 6.

As shown in the preferred embodiment of the invention, an extension securing means 20, see FIG. 6, is formed integrally with the stop member 13. In this regard, a lateral protuberance 21 is provided which extends to the side of the tonneau cover 2 as shown in FIG. 2, and which engages a receptacle on rear end side supports 22 (generally indicated in FIG. 1) in the cargo area side wall when the tonneau cover 2 is in the fully extended position, whereby the cargo area is covered by the tonneau cover assembly when the protuberances 21 are engaged with the rear end side supports.

As shown in FIG. 2, each lateral protuberance 21 extends a sufficient distance to enable the protuberance to be accommodated in a holding means on the side of the vehicle without interference from other portions of the tonneau cover. Although a lateral protuberance 21 is shown as a preferred securing means, because of, among other things, its economic and minimizing benefits, other securing means such as clips and the like are also contemplated.

As shown in FIGS. 4–9, in the preferred embodiment of the invention, a retraction limiting means 23 is also formed integrally with the stop member 13. In this regard, the stop members 13 each have two wedge-limit projections 24 on their upper surfaces 25, see FIG. 6, extending generally vertical from the stop member and having a generally vertical inner contact surface 26 facing inward towards the housing 3 which can engage an outer abutment front wall 27, see FIG. 4, of the housing 3 adjacent the opening 4 so that the flap 5 cannot be retracted into the opening.

However, although less preferred, it should be clearly understood that these projections 24 may be deleted without departing from the spirit of the invention. Although tv projections are preferred, clearly more or less projectio could be employed without departing from the spirit of t invention.

Therefore, as discussed above and as shown in FIGS. 6– in the preferred embodiment, each of the stop members is a "single" piece member which incorporates a variety functions in the one "single" piece, whereby econom advantages and minimization of parts and weight is great enhanced.

That is, a "single" piece stop member according to t most preferred embodiment incorporates the following fe tures and their functions:

(1) retraction limiting means 23, i.e., including as the wed limiting projections 24 which limit inward movement the tonneau cover;

(2) vibration damping means and wear reducing means, i. including the wedge-shaped section 16; and (3) extension securing means 20, i.e., including the late protuberances 21.

Thus, in the preferred construction, the present inventi combines these features into a "single" element, therel minimizing weight and the number of parts for assembl However, although clearly less preferred, the present inve tion also contemplates using separate members in order separately contain the above three features, alone or various combinations.

In order to secure the stop members 13 onto the tonne cover 2, the stop members 13, in a preferred embodimei include a slot 28 extending fully across the width of the st members 13 in a first direction and extending only partial across the width of the stop members 13 in a seco1 direction, as shown in FIGS. 4, 5, 7 and 9. In this mann the stop members 13 are divided into an upper extension 3 see FIG. 7, which extends over the flap and a low extension 29 which extends under the flap, while the st members 13 straddle the lateral sides 14, 15 of the flap Preferably, in order to secure the stop members to the flap two rivets 31 are secured within through holes 32, as shov in FIGS. 4 and 5.

As also shown in FIGS. 4 and 5, preferably, the slot 28 the stop members has a larger front dimension 33 and narrower rear dimension 34 at a rear side of the wedg shaped portion 16. In this manner, the wider flap cro section is accommodated in the larger front dimension a only the narrower flexible cover cross section is accomm dated in the narrower rear dimension. Among other thin; this (1) helps to securely hold the flap 5 within the st member 13, i.e., helps prevent the flap from being pulled o of the stop member 13, (2) enables the flap to extei partially into the housing, and (3) allows for a narrow wedge size at the rearmost side of the wedge-shaped secti 16, i.e., due to the narrower width of the flexible cover cro section.

In a preferred embodiment, the stop members 13 a formed by molding—and preferably molding a "sing piece". However, although less preferred, this invention al contemplates using other known means to form the st members. Further, although clearly less preferred, t present invention also contemplates forming each of the st members 13 from separate members which are later cor bined to form the unitary single piece.

In addition, the housing 3 of the invention is shown to l a single 'casing' member as illustrated, wherein the upp and lower walls are at upper and lower edges of the openi1 and wherein the outer abutment front wall is at a front of sa opening. However, the terminology "housing" used in t claims is defined to include that the housing 3 can be form with the outer abutment front wall 27 and/or the upper and lower walls 17, 18 "separate" from the basic 'casing' structure into which the tonneau cover is retracted. Thus, the housing 3 may include separate portions, e.g., with a basic 'casing' and upper and lower walls attached to the side walls 12 and fixed relative to the opening in the basic 'casing' of the housing 3. However, clearly, it is preferred to have these portions as part of the basic 'casing' of the housing 3, as illustrated, for economic, material minimizing and other benefits. In either circumstance, it should be understood that the upper and lower walls 17, 18 are located adjacent to the opening.

It will be apparent to those skilled in the art that the embodiments described may be varied as discussed above and in other manners, such as to meet particular specialized requirements, without departing from the true spirit and scope of the invention as claimed.

I claim:

1. A tonneau cover assembly, comprising:

a housing having an opening in one side thereof and having upper and lower walls located adjacent to said opening;

a spool rotatably mounted within said housing;

a tonneau cover extending through said opening and having an inner end secured to said spool, said tonneau cover being windable on said spool such that said tonneau cover is movable between a fully extended position and a fully retracted position wherein said tonneau cover is fully wound onto said spool, and said tonneau cover including a generally rigid flap attached at an outer end of said tonneau cover and extending substantially across a width of said tonneau cover;

means for winding said spool so as to bias said tonneau cover toward said fully retracted position;

at least a first stop member fixedly attached to said flap such that said stop member is generally immovable relative to said flap, wherein said stop member has a dimension that is greater than a height between said upper and lower walls to prevent said flap from winding onto said spool when said tonneau cover is in said fully retracted position and is fittable in between said upper and lower walls in said fully retracted position so as to inhibit said flap from vertically oscillating within said opening;

wherein said stop member has a wedge-shaped section which narrows in an inward direction towards said housing, a widest portion of said wedge-shaped section being greater than said height between said upper and lower walls, whereby said stop member is wedged into said opening when said tonneau cover is in said fully retracted position.

2. The assembly according to claim 1, wherein said stop member is secured to a periphery of said flap.

3. The assembly according to claim 2, further comprising a second stop member, wherein each of said stop members is secured to a respective peripheral lateral side edge of said flap.

4. A tonneau cover assembly, comprising:

a housing having an opening in one side thereof and having upper and lower walls located adjacent to said opening;

a spool rotatably mounted within said housing;

a tonneau cover extending through said opening and having an inner end secured to said spool, said tonneau cover being windable on said spool such that said tonneau cover is movable between a fully extended position and a fully retracted position wherein said tonneau cover is fully wound onto said spool, and said tonneau cover including a generally rigid flap attached at an outer end of said tonneau cover and extending substantially across a width of said tonneau cover;

means for winding said spool so as to bias said tonneau cover toward said fully retracted position;

at least a first stop member attached to said flap, wherein said stop member has a dimension that is greater than a height between said upper and lower walls to prevent said flap from winding onto said spool when said tonneau cover is in said fully retracted position and is fittable in between said upper and lower walls in said fully retracted position so as to inhibit said flap from vertically oscillating within said opening;

wherein said stop member is secured to a periphery of said flap and has a wedge-shaped section which narrows in an inward direction towards said housing, a widest portion of said wedge-shaped section being greater than said height between said upper and lower walls, whereby said stop member is wedged into said opening when said tonneau cover is in said fully retracted position; and wherein said stop member includes a projection which extends generally vertically from said stop member and which has a contact surface facing said housing and abuttable against said housing to prevent said flap from entering the opening when said tonneau cover is in the fully retracted position.

5. A tonneau cover assembly, comprising:

a housing having an opening in one side thereof and having upper and lower walls located adjacent to said opening;

a spool rotatably mounted within said housing;

a tonneau cover extending through said opening and having an inner end secured to said spool, said tonneau cover being windable on said spool such that said tonneau cover is movable between a fully extended position and a fully retracted position wherein said tonneau cover is fully wound onto said spool, and said tonneau cover including a generally rigid flap attached at an outer end of said tonneau cover and extending substantially across a width of said tonneau cover;

means for winding said spool so as to bias said tonneau cover toward said fully retracted position;

first and second stop members attached to said flap, wherein each of said first and second stop members has a dimension that is greater than a height between said upper and lower walls to prevent said flap from winding onto said spool when said tonneau cover is in said fully retracted position and is fittable in between said upper and lower walls in said fully retracted position so as to inhibit said flap from vertically oscillating within said opening;

wherein each of said first and second stop members is secured to a periphery of said flap and has a wedge-shaped section which narrows in an inward direction towards said housing, a widest portion of said wedge-shaped section being greater than said height between said upper and lower walls, whereby each of said first and second stop members is wedged into said opening when said tonneau cover is in said fully retracted position;

wherein each of said first and second stop members is secured to a respective peripheral lateral side edge of said flap; and wherein each of said first and second stop members includes a projection which extends generally vertically from said stop members and which has a contact surface facing said housing and abuttable against said housing to prevent said flap from entering the opening when said tonneau cover is in the fully retracted position.

6. The assembly according to claim 1, 2, 3, 4, or 5, wherein at least said first stop member further includes securing means for securing said flap to a fixed support to maintain said tonneau cover in said fully extended position.

7. The assembly according to claim 6, wherein said securing means includes a laterally extending protuberance.

8. The assembly according to claim 1, wherein said upper and lower walls are at upper and lower edges of said opening.

9. The assembly according to claim 8, wherein said upper and lower edges of said housing include a trim extrusion thereon.

10. A tonneau cover assembly, comprising:
   a housing having an opening in one side thereof;
   a tonneau cover which extends through said opening into said housing and which includes a generally rigid flap at an outer end thereof extending substantially across a width of said tonneau cover;
   biasing means for biasing said cover into said housing such that said tonneau cover is movable between a fully extended position and a fully retracted position;
   at least a first stop member fixedly attached to said flap such that said stop member is generally immovable relative to said flap, said stop member comprising a single integral piece, which includes
   (1) retraction limiting means for limiting inward movement of the flap into said opening,
   (2) vibration damping means for reducing vibrations in a vertical direction, and
   (3) extension securing means, cooperatively engageable with predetermined fixed supports, for securing the tonneau cover in the fully extended position.

11. The assembly according to claim 10, further comprising at least a second stop member, wherein each of said stop members is secured to a respective lateral side edge of said flap.

12. The assembly according to claim 10, wherein the vibration damping means includes a wedge-shaped section for wedgingly securing said stop member with respect to said housing.

13. A stop member for a tonneau cover assembly in which a tonneau cover having a generally rigid end flap is retractable into a housing, said stop member, comprising:
   means for fixedly attaching the stop member to the generally rigid end flap of the tonneau cover such that the stop member is generally immovable relative to the end flap; and
   vibration damping means for reducing vibrations in a vertical direction, wherein said stop member comprises a single integral piece;
   wherein said vibration damping means includes a wedge-shaped section for wedgingly securing said stop member with respect to said housing, said wedge shape section including inclined upper and lower surfaces the stop member which are sufficiently inclined provide a secure fitting wedge connection.

14. The assembly according to claim 13, wherein said sto member further includes retraction limiting means for lir iting inward movement of the tonneau cover into the hou ing.

15. The assembly according to claim 13, wherein said sto member further includes extension securing means, coo eratively engageable with predetermined fixed supports, f securing the tonneau cover in the fully extended positior 16. In combination:
   a) a vehicle having a rear end cargo area, and a rear e1 side support in said rear end cargo area;
   b) a tonneau cover assembly, comprising:
   a housing having an opening in one side thereof a1 having upper and lower walls located adjacent to sa opening;
   a spool rotatably mounted within said housing;
   a tonneau cover extending through said opening a1 having an inner end secured to said spool, said tonne: cover being windable on said spool such that sa tonneau cover is movable between a fully extend( position and a fully retracted position wherein sa tonneau cover is fully wound onto said spool, and sa tonneau cover including a generally rigid flap attach( at an outer end of said tonneau cover and extendir substantially across a width of said tonneau cover;
   means for winding said spool so as to bias said tonne: cover toward said fully retracted position;
   at least a first stop member fixedly attached to said fl: such that said stop member is generally immovab relative to said flap, wherein said stop member a) h: a dimension that is greater than a height between sa upper and lower walls to prevent said flap from win( ing onto said spool when said tonneau cover is in sa fully retracted position and b) is fittable in between sa upper and lower walls in said fully retracted position ! as to inhibit said flap from vertically oscillating with: said opening, wherein said stop member has a wedg( shaped section which narrows in an inward directic towards said housing, a widest portion of said wedg( shaped section being greater than said height betwee said upper and lower walls, whereby said stop memb( is wedged into said opening when said tonneau cover in said fully retracted position; and
   said stop member further includes securing means f( securing said flap to maintain said tonneau cover in sai fully extended position; and
   c) wherein said housing is engaged with a side support i said cargo area, and said securing means is engageab. with said rear end side support in the vehicle when sai tonneau cover is in said fully extended positio1 whereby the cargo area is covered by said tonnea cover assembly when said securing means is engage with said rear end side support.

* * * * *